(12) United States Patent
Cho et al.

(10) Patent No.: US 10,489,520 B2
(45) Date of Patent: Nov. 26, 2019

(54) METHOD AND APPARATUS FOR INJECTING FAULT AND ANALYZING FAULT TOLERANCE

(71) Applicant: ELECTRONICS AND TELECOMMUNICATIONS RESEARCH INSTITUTE, Daejeon (KR)

(72) Inventors: Yong-Cheol Cho, Daejeon (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 484 days.

(21) Appl. No.: 15/154,829

(22) Filed: May 13, 2016

(65) Prior Publication Data

US 2016/0334467 A1    Nov. 17, 2016

(30) Foreign Application Priority Data

May 14, 2015   (KR) .................. 10-2015-0067112

(51) Int. Cl.
*G06F 17/50* (2006.01)
*G06F 11/00* (2006.01)
*G06F 11/26* (2006.01)

(52) U.S. Cl.
CPC ........... *G06F 17/50* (2013.01); *G06F 11/261* (2013.01); *G06F 17/5045* (2013.01)

(58) Field of Classification Search
CPC ..... G06F 17/50; G06F 11/261; G06F 17/5045

USPC ........................................................ 716/106
See application file for complete search history.

(56) References Cited

U.S. PATENT DOCUMENTS

| | | | |
|---|---|---|---|
| 6,876,934 B2* | 4/2005 | Marlett | G01R 31/31835 324/512 |
| 7,284,159 B2 | 10/2007 | Chakraborty et al. | |
| 7,308,660 B2* | 12/2007 | Nozuyama | G06F 11/261 714/724 |
| 7,320,114 B1* | 1/2008 | Jain | G06F 11/261 714/47.1 |
| 8,001,438 B1* | 8/2011 | Pabari | G11C 29/10 324/526 |
| 8,046,639 B1* | 10/2011 | Nordin | G06F 11/2268 714/32 |

(Continued)

FOREIGN PATENT DOCUMENTS

| | | |
|---|---|---|
| CN | 100452059 C | 1/2009 |
| KR | 10-2009-0068259 A | 6/2009 |
| WO | WO-2008/048418 A2 | 4/2008 |

*Primary Examiner* — Stacy Whitmore
(74) *Attorney, Agent, or Firm* — Rabin & Berdo, P.C.

(57) ABSTRACT

Disclosed herein is a method and apparatus for injecting a fault and analyzing fault tolerance. The fault tolerance analysis apparatus extracts design information from a design. The fault tolerance analysis apparatus may inject a fault into a simulation of the design based on the extracted design information and parameters, and analyzes an influence of the fault on the simulation. Accordingly, in accordance with the fault tolerance analysis apparatus, fault tolerance for the fault injected into the simulation is analyzed, and the effect of the fault tolerance mechanism provided in the design is analyzed.

16 Claims, 8 Drawing Sheets

(56) References Cited

U.S. PATENT DOCUMENTS

| | | | | |
|---|---|---|---|---|
| 8,464,102 B2* | 6/2013 | Sinha | ............... | G06F 11/079 |
| | | | | 714/26 |
| 8,572,529 B2* | 10/2013 | Zawalski | ............ | G06F 17/5027 |
| | | | | 703/13 |
| 8,949,101 B2* | 2/2015 | Bose | ............. | G01R 31/318357 |
| | | | | 703/14 |
| 8,959,394 B2* | 2/2015 | Liang | ................... | G06F 11/006 |
| | | | | 714/15 |
| 2004/0034495 A1* | 2/2004 | Marlett | ............ | G01R 31/31835 |
| | | | | 702/117 |
| 2005/0050387 A1 | 3/2005 | Mariani et al. | | |
| 2008/0263400 A1 | 10/2008 | Waters et al. | | |
| 2010/0251201 A1* | 9/2010 | Chin | ................... | G06F 3/0482 |
| | | | | 716/104 |
| 2010/0269086 A1* | 10/2010 | Granik | ................. | B82Y 10/00 |
| | | | | 716/52 |
| 2010/0274549 A1* | 10/2010 | Tal | ...................... | G06F 17/5022 |
| | | | | 703/17 |
| 2011/0153073 A1 | 6/2011 | Jang et al. | | |
| 2011/0214014 A1* | 9/2011 | Bertacco | ............ | G06F 11/2236 |
| | | | | 714/15 |
| 2012/0239993 A1 | 9/2012 | Chung | | |
| 2013/0096902 A1* | 4/2013 | Bose | ............... | G01R 31/31816 |
| | | | | 703/14 |
| 2014/0089731 A1 | 3/2014 | Lee | | |
| 2015/0212923 A1* | 7/2015 | Sugiyama | ........... | G06F 11/3644 |
| | | | | 714/38.1 |
| 2016/0070835 A1* | 3/2016 | Foisy | ............ | G01R 31/318519 |
| | | | | 716/108 |

* cited by examiner

METHOD AND APPARATUS FOR INJECTING FAULT AND ANALYZING FAULT TOLERANCE

CROSS REFERENCE TO RELATED APPLICATION

This application claims the benefit of Korean Patent Application No. 10-2015-0067112, filed May 14, 2015, which is hereby incorporated by reference in its entirety into this application.

BACKGROUND OF THE INVENTION

1. Technical Field

The following embodiments generally relate to a digital circuit design and, more particularly, to a method and apparatus for injecting a fault and analyzing fault tolerance.

2. Description of the Related Art

As transistor sizes continue to shrink, transient faults have emerged as a major obstacle to the reliability of semiconductor components. As a result, fault tolerance mechanisms in semiconductors have attracted substantial attention in applications in which safety is essentially required. Applications in which safety is essentially required include applications in the automobile industry, the aviation industry, etc.

Fault tolerance analysis for digital circuits may be performed at several levels of abstraction depending on the circumstances. At a relatively low level, faults may be analyzed as being related to individual transistor elements, switches, and gates. At a relatively high level, faults may be analyzed at a Register Transfer Level (RTL) and a system level. In the following embodiments, a fault injection and fault analysis methodology will be described, and the digital circuit design at RTL level may be required as the target into which faults are to be injected and analyzed.

A Programming Language Interface (PLI) may be an Application Program Interface (API) for a Verilog Hardware Description Language (HDL). PLI may provide a means for invoking a C function from Verilog code. Further, PLI may be used for various objects. In the following embodiments, PLI may be used to extract information about a design to be utilized in the injection of faults and in the analysis of fault tolerance.

In spite of efforts to apply various fault tolerance mechanisms, no standard means for injecting faults and analyzing the effectiveness of an implemented fault tolerance mechanism has been proposed at the present time. In the following embodiments, a methodology and a required apparatus, which inject faults into the design of a Very Large Scale Integration (VLSI) processor and analyze the faults at development time, are described below.

In relation to fault injection and fault analysis, Korean Patent Application No. 2009-7007874 and U.S. Patent Application Publication Nos. 2011-0214014 and 2008-0263400 are disclosed.

SUMMARY OF THE INVENTION

An embodiment is intended to provide an apparatus and method for injecting a fault into a simulation of a digital circuit design and analyzing fault tolerance for the injected fault.

Another embodiment is intended to provide an apparatus and method for analyzing the effect of a fault tolerance mechanism.

In accordance with an aspect, there is provided an apparatus for analyzing fault tolerance, including an information extraction unit for extracting design information from a design; a fault injection unit for injecting at least one fault into a simulation of the design based on the extracted design information and parameters; and a fault tolerance analysis unit for analyzing an influence of the fault on the simulation.

The design may be a processor design for a processor.

The design may be represented in a Hardware Description Language (HDL).

The information extraction unit may extract the design information from the design using a Programming Language Interface (PLI).

The fault tolerance analysis unit may analyze the influence of the fault by comparing information about a normal simulation with information about the simulation injected with the fault.

The fault tolerance analysis unit may determine whether the fault manifests itself as a malfunction of a processor represented by the design.

The fault tolerance analysis unit may be configured to, if the fault does not cause an error in registers of the processor, determine that the fault does not manifest itself as a malfunction of the processor.

The fault tolerance analysis unit may be configured to, if the fault has influence on occurrence of an error in writing to memory, determine that the fault manifests itself as a malfunction of the processor.

The fault tolerance analysis unit may evaluate a fault tolerance mechanism of a processor represented by the design.

The fault tolerance analysis unit may evaluate the fault tolerance mechanism only when the fault injected into a processor not equipped with the fault tolerance mechanism manifests itself as a malfunction of the processor when the fault tolerance mechanism is evaluated.

The fault injection unit may inject the fault by manipulating registers in a processor represented by the design.

The information extraction unit may extract information about registers in the design.

The information about registers may include at least one of a name, a bit width, a Hardware Description Language (HDL) access path, and a module path of each register.

The parameters may control a target into which the fault is to be injected

The target into which the fault is to be injected may be a signal or a module.

The parameters may control attributes of faults

The attributes of faults may include at least one of a duration of each fault, time of occurrence of each fault, an injection location of each fault, and a number of faults.

The fault tolerance analysis unit may insert a Value Change Dump (VCD) module for recording a write operation for memory in the simulation, which occurs during the simulation, into the memory.

The fault tolerance analysis unit may be configured to generate a first VCD module for a simulation into which the fault is not injected, generate a second VCD module for a simulation into which the fault is injected, and determine whether the fault causes a malfunction of a processor represented by the design by comparing recordings of the first VCD module with recordings of the second VCD module.

In accordance with another aspect, there is provided a method for analyzing fault tolerance, including extracting design information from a design; injecting a fault into a simulation of the design based on the extracted design information and a parameter; and analyzing an influence of the fault on the simulation.

In accordance with a further aspect, there is provided a method for analyzing a fault, including analyzing a first influence of a fault, injected into a first design, on the first design; analyzing a second influence of the fault, injected into a second design, on the second design; and comparing the first design with the second design based on the first influence and the second influence.

The first design may denote a processor not equipped with a fault tolerance mechanism.

The second design may denote a processor equipped with the fault tolerance mechanism.

Comparing the first design with the second design may be configured to determine an effect of the fault tolerance mechanism by comparing the first influence with the second influence.

In addition, there may be provided other methods, apparatuses, and systems for implementing the present disclosure, and a computer-readable storage medium storing a computer program for executing the method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. It should be understood that embodiments are different, but they do not need to be exclusive to each other.

The terms used in the embodiments may be construed based on substantial meanings of the terms and contents throughout the present specification rather than the simple names of the terms.

In the embodiments, a connection relationship between a specific component and another component may include an indirect connection relationship therebetween via an additional component as well as a direct relationship therebetween. The same reference numerals presented in respective drawings may designate the same components.

Figure 1:
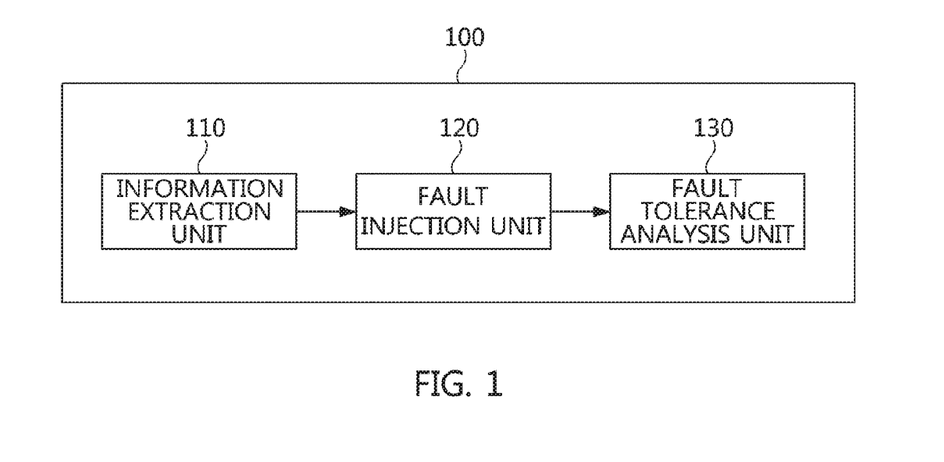
FIG. 1 illustrates the configuration of a fault tolerance analysis apparatus according to an embodiment.

FIG. 1 illustrates the configuration of a fault tolerance analysis apparatus according to an embodiment.

A fault tolerance analysis apparatus 100 may include an information extraction unit 110, a fault injection unit 120, and a fault tolerance analysis unit 130.

The fault tolerance analysis apparatus 100 may be related to the injection of a fault and the analysis of fault tolerance during a simulation of a design in a Hardware Description Language (HDL) at the development time of the design. In other words, the fault tolerance analysis apparatus 100 may simulate the injection of a fault into a design and the analysis of fault tolerance.

The design desired to be tested may be a design for a processor. A design may be represented in HDL. In other words, the design created in HDL may be data indicating a circuit such as one for a processor. The simulation may be configured to virtually operate, using a design, a processor or the like represented by the design.

The information extraction unit 110 may extract design information from the design.

The fault injection unit 120 may inject a fault into the design based on the extracted design information and a parameter. The fault injection unit 120 may inject a fault into the simulation of the design based on the extracted design information and a parameter.

The fault tolerance analysis unit 130 may analyze the influence of the fault injected into the design. The fault tolerance analysis unit 130 may analyze the influence of the fault injected into the simulation.

Further, the fault tolerance analysis unit 130 may analyze the severity of the fault injected into the design, whether the fault manifests itself, whether the fault is tolerated, etc.

For example, the fault tolerance analysis apparatus 100 may run the simulation of the design. Here, the fault injection unit 120 may inject the fault into the run simulation, and the fault tolerance analysis unit 130 may analyze the influence of the injected fault.

Below, a fault, fault tolerance, and the analysis of fault tolerance according to an embodiment will be described.

The analysis of faults in a pipeline design based on registers may conform to an operation based on flip-flops. For example, as a pipeline design based on the registers, there is a pipelined processor. The design of the processor may be divided into pipeline stages. Each stage may have a set of registers in which information is to be stored. Each stage may transfer information to a subsequent stage via the set of registers. Logic circuitry for processing the data provided from a previous stage may be present between registers in each stage.

When a fault occurs in the circuitry, the fault may manifest itself as a malfunction of a processor system, or may be ignored, without manifesting itself as a malfunction. When a fault occurring in the circuitry has no influence on the system, the fault may be ignored. In other words, a fault may be completely wiped out via masking.

When a fault tolerance mechanism in the processor is evaluated, only a fault manifesting itself as a malfunction of the processor may be a target to be taken into consideration. The reason for this is that the remaining faults may not influence the correct operation of the system or processor.

The fault tolerance analysis unit 130 may evaluate the fault tolerance mechanism of the system or processor represented by the design. The fault tolerance analysis unit 130 may determine whether the fault injected by the fault injection unit 120 manifests itself as a malfunction of the system or processor represented by the design. When the fault tolerance mechanism of the system or processor represented by the design is evaluated, the fault tolerance analysis unit 130 may evaluate the fault tolerance mechanism of the system or processor represented by the design against the fault injected by the fault injection unit 120 only when the injected fault manifests itself as a malfunction of the system or processor represented by the design. Alternatively, when the fault tolerance mechanism of the system or processor represented by the design is evaluated, the fault tolerance analysis unit 130 may evaluate the fault tolerance mechanism of the system or processor represented by the design against a fault injected by the fault injection unit 120 into a processor not equipped with the fault tolerance mechanism only when the injected fault manifests itself as a malfunction of the processor or system.

A fault may occur in any portion of the system or processor. The probability that a specific circuit will be influenced by a fault may depend on the area covered by the specific circuit. In the design of a processor based on a pipeline, faults which cause no errors in pipeline registers may not manifest themselves as processor malfunctions. Therefore, faults which cause no errors in pipeline registers may be effectively ignored. When the injected fault does not cause errors in the registers of the processor represented by the design, the fault tolerance analysis unit 130 may determine that the injected fault does not manifest itself as a malfunction of the processor.

On the other hand, faults concerned in embodiments may be operations of altering data stored in the pipeline registers. Therefore, when the fault tolerance mechanism in the design of the processor is evaluated, a fault may be injected by manipulating registers in the processor represented by the design. The fault injection unit 120 may inject a fault into the design by manipulating the registers in the processor represented by the design. The manipulation of the registers may include alteration of the values of registers. Here, the altered values may include fixed values, values generated based on a predetermined rule, values obtained by applying a predetermined operation to current register values, random values, etc.

As shown in FIG. 1, the fault tolerance analysis apparatus 100 according to an embodiment may include the information extraction unit 110, the fault injection unit 120, and the fault tolerance analysis unit 130. According to the embodiment, at least some of the information extraction unit 110, the fault injection unit 120, and the fault tolerance analysis unit 130 may be program modules, and may communicate with an external device or system. Such program modules may be included in the fault tolerance analysis apparatus 100 in the form of an operating system, an application program module, and an additional program module, and may be physically stored in various types of well-known storage devices. Further, at least some of the program modules may be stored in a remote storage device capable of communicating with the fault tolerance analysis apparatus 100. Such program modules may include, but are not limited to, a routine, a subroutine, a program, an object, a component, and a data structure for performing specific tasks, which will be described later according to the present invention, or for executing specific abstract data types. Each of the program modules may be implemented using instructions that are executed by at least one processor of the fault tolerance analysis apparatus 100.

Figure 2:
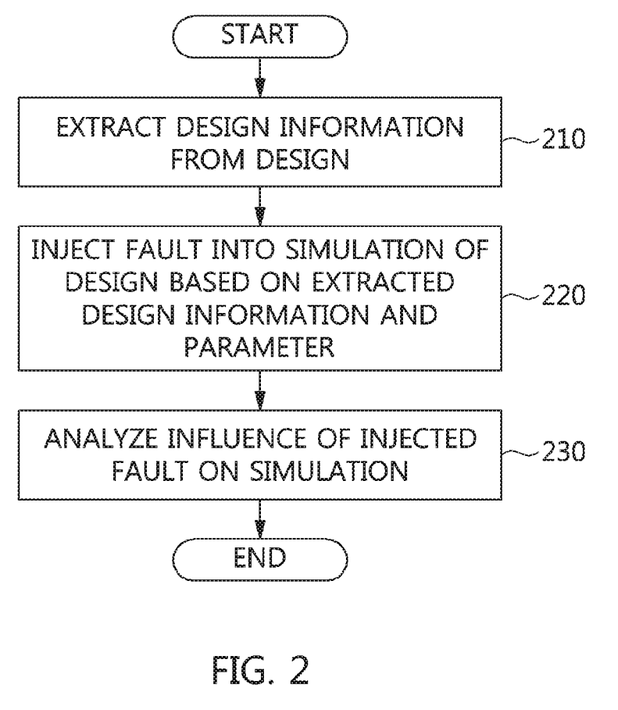
FIG. 2 is a flowchart showing a fault tolerance analysis method according to an embodiment.

FIG. 2 is a flowchart showing a fault tolerance analysis method according to an embodiment of the present invention.

The analysis of fault tolerance by the fault tolerance analysis apparatus 100 may include three major steps 210, 220, and 230.

At step 210, the information extraction unit 110 may extract design information from a design. The information extraction unit 110 may extract design information from a design created in HDL using a PLI.

The extraction of the design information will be described in detail later with reference to FIG. 3.

At step 220, the fault injection unit 120 may generate a fault, represented in Verilog HDL for the simulation, based on the extracted design information and a parameter, and may insert the generated fault into the top level of the simulation of the design. By means of this insertion, the fault injection unit 120 may inject the generated fault.

The injection of the fault will be described in detail later with reference to FIG. 4.

At step 230, the fault tolerance analysis unit 130 may analyze the influence of the injected fault on the simulation.

The fault tolerance analysis unit 130 may analyze the influence of the injected fault by comparing information about a normal simulation with information about the simulation into which the fault was injected.

The analysis of the influence of the fault will be described in detail later with reference to FIG. 5.

Since the technical details set forth above with reference to FIG. 1 may be applied without change, a detailed description thereof will be omitted.

Figure 3:
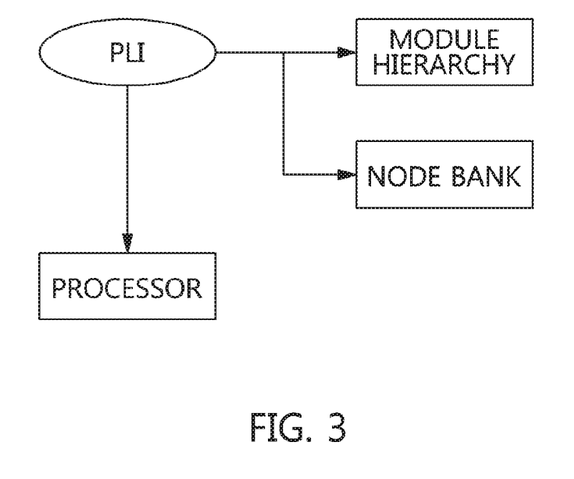
FIG. 3 illustrates the extraction of design information according to an example.

FIG. 3 illustrates the extraction of design information according to an embodiment.

FIG. 3 schematically illustrates the operation of the information extraction unit 110 at step 210, described above with reference to FIG. 2.

When the performance of fault tolerance of a processor is analyzed, testing coverage may be required. In response to the requirement for testing coverage, a fault must be injected into all possible locations where there is the possibility of causing meaningful faults. Here, the term "meaningful faults" means faults manifesting themselves as malfunctions. An example of all possible locations where there is the possibility of causing meaningful faults may be all registers of the processor represented by the design. In other words, in response to the requirement for testing coverage, the fault injection unit 120 may regard all registers of the processor represented by the design as the target into which faults are to be injected.

Furthermore, detailed analysis related to which module in the processor is vulnerable to faults may be meaningful information when enhancing the fault tolerance of the processor.

In order to inject a fault, as described above with reference to FIG. 1, design information must be able to be extracted from a design. For example, in a design represented in Verilog HDL, the extracted design information may include information about nodes. Further, the node information may include a node bank and a module hierarchy.

The node bank may denote the nodes constituting a design. In Verilog HDL, the nodes may correspond to the registers of the processor represented by the design. For example, the node bank may be a register node bank, and may include information about the registers of the processor represented by the design. Further, the node bank may include a list of all registers of the processor represented by the design.

The module hierarchy may denote the hierarchical relationship between the modules constituting the design.

The information extraction unit 110 may extract the node bank and the module hierarchy from the design using a PLI. Via the PLI, the node bank and the module hierarchy may be extracted from the design.

The PLI may be an API to Verilog HDL. The PLI may provide a means for invoking a C function from Verilog code. The PLI may be used on various objects. The PLI may be used together with Verilog HDL required to design the processor so as to extract the design information. The extracted design information may be used to inject faults and analyze fault tolerance.

When the design is an RTL design, the PLI is used in the RTL design of the core of the processor, and thus information about all registers in the design may be extracted. The information extraction unit 110 may extract information about registers in the design by utilizing the PLI in the RTL design. The extracted register information may be information about all registers in the design.

Here, the register information may include at least one of the name, the bit width, the HDL access path, and the module path of each register.

Further, as the PLI is used in the RTL design of the core of the processor, information about the module hierarchy may be extracted. The information extraction unit 110 may extract information about the module hierarchy in the RTL design by utilizing the PLI in the RTL design.

Both the node bank and the module hierarchy may be written to a pre-formatted file. The information extraction unit 110 may individually write the node bank and the module hierarchy to the pre-formatted file.

In FIG. 3, the processor in a lower portion may indicate that a PLI is operated only when associating with a simulation of the design that is the target of experiments. Here, the operation of the PLI may mean a function of extracting information about the design. The design information may include the module hierarchy and the node bank.

Figure 4:
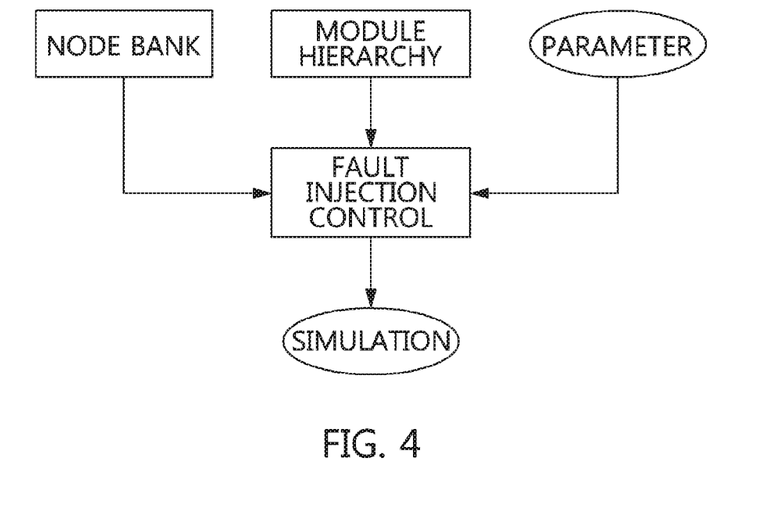
FIG. 4 describes the injection of a fault according to an example.

FIG. 4 illustrates the injection of a fault according to an embodiment.

FIG. 4 may schematically illustrate the operation of the fault injection unit 120 at step 220, described above with reference to FIG. 2.

The fault injection unit 120 may control the injection of a fault into a simulation of a design using the node bank, module hierarchy, and parameters.

The node bank (or a list of all registers in the processor) described above with reference to FIG. 3 may provide a fault injection site for completely covering the design of the processor with respect to a fault injection campaign. The fault injection campaign may denote a series of tasks that includes the injection of a fault and that is performed by the fault tolerance analysis apparatus 100 to analyze the influence of the fault.

The module hierarchy may provide a means for targeting a specific module for the injection of a fault and analysis of fault tolerance.

To inject a fault, the fault injection unit 120 may parse the file of the node bank and the file of the module hierarchy. Also, the fault injection unit 120 may process modules in the module hierarchy and may internally regenerate the module hierarchy.

The function of the fault injection unit 120 may be divided into a fault injection control program and a fault injection module, which will be described later. For example, the fault injection unit 120 may include a fault injection control program and a fault injection module. Alternatively, the fault injection unit 120 may execute the fault injection control program and the fault injection module. The parsing of the files, the processing of the modules, and the regeneration of the module hierarchy, which are described above, may be controlled by the fault injection control program.

The parameter used to inject faults may be a user input parameter. In other words, the user of the fault tolerance analysis apparatus 100 may control the faults to be injected using the parameter.

The parameter may control the target into which faults are to be injected and may control the attributes of the faults. The target into which faults are to be injected may be 1) at least one signal into which faults are to be injected or 2) at least one module into which faults are to be injected. The attributes of faults may be at least one of 1) the duration of each fault, ii) the time of occurrence of each fault, iii) the injection location of each fault, and iv) the number of injected faults. Depending on the circumstances, the parameter may include multiple parameters.

The parameter present before a fault is injected may be randomized. The value of the parameter may be dependent on the fault injection campaign. For example, the fault injection control program may take a randomized parameter, and may generate information to be read by the fault injection module, which will be described later.

In order to inject a fault into a design simulation, the fault injection module, which is executed together with the module at the top level of the simulation of the fault tolerance analysis apparatus 100, may be required. The fault injection module may be a small-scale RTL module for injecting a fault into the simulation. The fault injection module may be executed together with the top-level module of the simulation of the fault tolerance analysis apparatus 100.

The injection of the fault may be performed via interaction between the fault injection control program and the fault injection module. For example, the fault injection module may alter the value of a targeted register in the simulation by exploiting the information provided by the fault injection control program. For example, when the value of the targeted register is altered, the fault injection module may alter the value of the targeted register at the time specified by the fault injection control program. Further, the fault injection module may alter the value of the targeted register for the duration specified by the fault injection control program. After the value of the register has been altered, the simulation of the processor may be performed.

Figure 5:
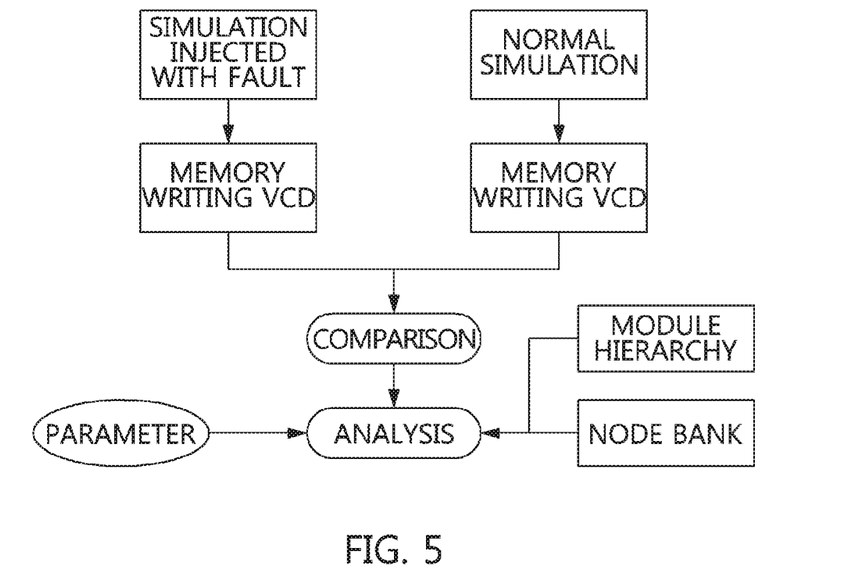
FIG. 5 describes the analysis of influence of a fault according to an example.

FIG. 5 illustrates the analysis of the influence of a fault according to an example.

FIG. 5 may schematically illustrate the operation of the fault tolerance analysis unit 130 at step 230, described above with reference to FIG. 2.

The fault tolerance analysis unit 130 may collect information to determine whether a fault injected in the fault injection campaign leads to a malfunction of a processor or a system as a result of fault injection.

A conventional processor is based on memory. Therefore, the result of the processor may be manifested only when the processor writes the result to the memory. The memory may include main memory and a table for registers of the processor. Therefore, a fault that influences writing to the memory may be a fault that manifests itself as a malfunction of the processor or the system. When the injected fault influences the writing to the memory, the fault tolerance analysis unit 130 may determine that the injected fault is a fault that manifests itself as a malfunction of the processor or system.

Even if the injected fault manifests itself as an erroneous value for the registers of the processor, it may not influence the output of the processor to be written to the memory.

When the injected fault does not influence the output of the processor to be written to the memory, the injected fault may be considered to be a fault that may be resisted by a fault tolerance mechanism present in the design or that may be wiped out via masking. Even if the injected fault manifests itself as an erroneous value for the registers of the processor, when the fault does not influence the output of the processor to be written to the memory, the fault tolerance analysis unit 130 may determine that the injected fault is a fault that may be either resisted by the fault tolerance mechanism present in the design or wiped out via masking.

The fault tolerance analysis unit 130 may insert a small-sized Value Change Dump (VCD) module for recording a write operation for the memory in the simulation, which occurs during the simulation, into the memory. The memory may include main memory and the table of registers. The VCD module may be configured in HDL.

The VCD module may be intended only for the purpose of simulation, and may not influence the operation of the system or processor. The VCD module may record variation in values in the main memory and values in the table of registers.

In order to analyze the fault tolerance of a specific design, the fault tolerance analysis unit 130 may generate a first VCD for a simulation not injected with a fault, and a second VCD for a simulation injected with a fault. In other words, the first VCD may be a reference VCD for the simulation injected with the fault. The fault tolerance analysis unit 130 may determine whether the fault injected in the fault injection campaign causes a malfunction in the system or processor represented by the design by comparing recordings of the first VCD with recordings of the second VCD.

After comparing the recordings of the first VCD with the recordings of the second VCD, the fault tolerance analysis unit 130 may analyze the influence of the injected fault based on the result of the comparison. The fault tolerance analysis unit 130 may use the above-described node bank, module hierarchy and parameter when analyzing the influence of the fault.

The fault tolerance analysis unit 130 may acquire statistics on faults. For example, the statistics on faults may include an error manifestation rate for faults. The error manifestation rate may be the ratio of faults that actually manifested themselves as malfunctions to the number of injected faults.

Figure 6:
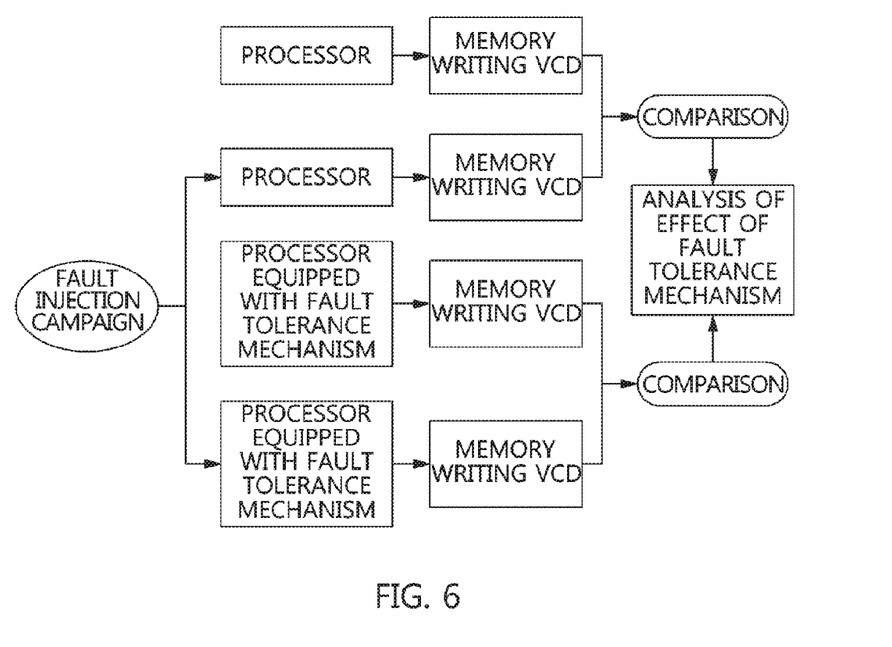
FIG. 6 illustrates the analysis of a fault tolerance mechanism according to an example.

FIG. 6 illustrates the analysis of a fault tolerance mechanism according to an example.

The processor or system represented by a design may include a fault tolerance mechanism for fault tolerance. The fault tolerance analysis unit 130 may analyze the fault tolerance mechanism.

To analyze fault tolerance of the fault tolerance mechanism, the fault tolerance analysis unit 130 may analyze a bare processor that is not equipped with the fault tolerance mechanism. The analysis of the bare processor may be performed using the same method as that of the embodiments described above with reference to FIGS. 1 to 5. The fault tolerance analysis unit 130 may generate respective memory writing VCDs for the case where a fault is not injected into the bare processor and the case where a fault is injected into the bare processor. The fault tolerance analysis unit 130 may analyze the influence of the injected fault on the bare processor by comparing the two VCDs with each other.

For example, the fault tolerance analysis unit 130 may calculate the error manifestation rate of the bare processor by analyzing the bare processor.

Next, the fault tolerance analysis unit 130 may analyze a processor equipped with the fault tolerance mechanism. The analysis of the processor may be performed using the same method as that of the embodiments described above with reference to FIGS. 1 to 5. The fault tolerance analysis unit 130 may generate respective memory writing VCDs for the case where a fault is not injected into the processor equipped with the fault tolerance mechanism and the case where a fault is injected into the processor equipped with the fault tolerance mechanism. The fault tolerance analysis unit 130 may analyze the influence of the injected fault on the processor equipped with the fault tolerance mechanism by comparing the two VCDs with each other.

The fault tolerance analysis unit 130 may analyze the effect of the fault tolerance mechanism by comparing the influence of the injected fault on the bare processor with the influence of the injected fault on the processor equipped with the fault tolerance mechanism.

For example, the fault tolerance analysis unit 130 may calculate the error manifestation rate of the processor equipped with the fault tolerance mechanism. Further, the fault tolerance analysis unit 130 may compare the error manifestation rate of the bare processor with the error manifestation rate of the processor equipped with the fault tolerance mechanism. The fault tolerance analysis apparatus 100 may use the same fault injection campaign as that used to evaluate the effectiveness of the fault tolerance mechanism in order to compare the error manifestation rate of the bare processor with the error manifestation rate of the processor equipped with the fault tolerance mechanism.

Figure 7:
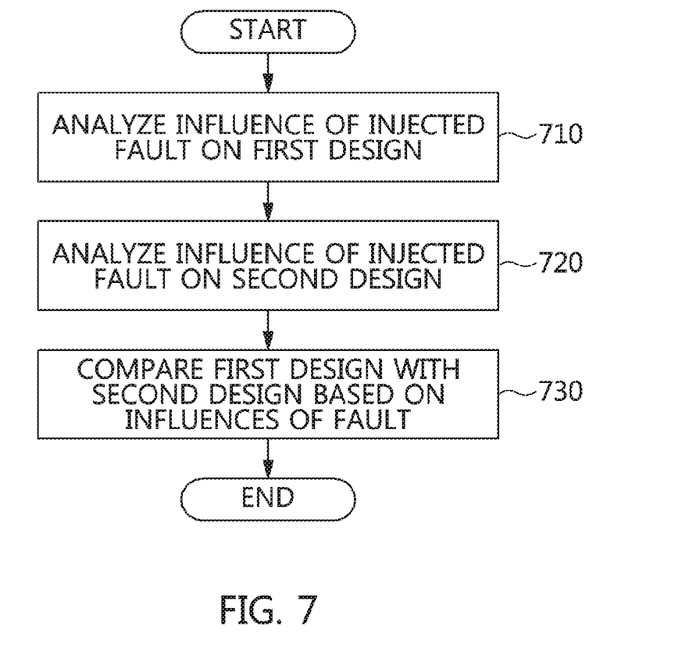
FIG. 7 is a flowchart showing a fault analysis method according to an embodiment.

FIG. 7 is a flowchart showing a fault analysis method according to an embodiment.

At step 710, the fault tolerance analysis apparatus 100 may analyze the first influence of a fault, injected into a first design, on the first design. Step 710 may include steps 210, 220, and 230, described above with reference to FIG. 2.

For example, the first design may denote a processor not equipped with a fault tolerance mechanism. The first influence may include statistics on the injected fault.

At step 720, the fault tolerance analysis apparatus 100 may analyze the second influence of a fault injected into a second design, on the second design. Step 720 may include steps 210, 220, and 230, described above with reference to FIG. 2.

For example, the second design may denote a processor equipped with the fault tolerance mechanism. The second influence may include statistics on the injected fault.

At step 730, the fault tolerance analysis apparatus 100 may compare the first design with the second design based on the first influence and the second influence.

For example, the fault tolerance analysis apparatus 100 may determine the effect of the fault tolerance mechanism provided in the second design by comparing the first influence with the second influence.

Since the technical details described above with reference to FIGS. 1 to 6 may be applied to this method without change, a detailed description thereof will be omitted.

Figure 8:
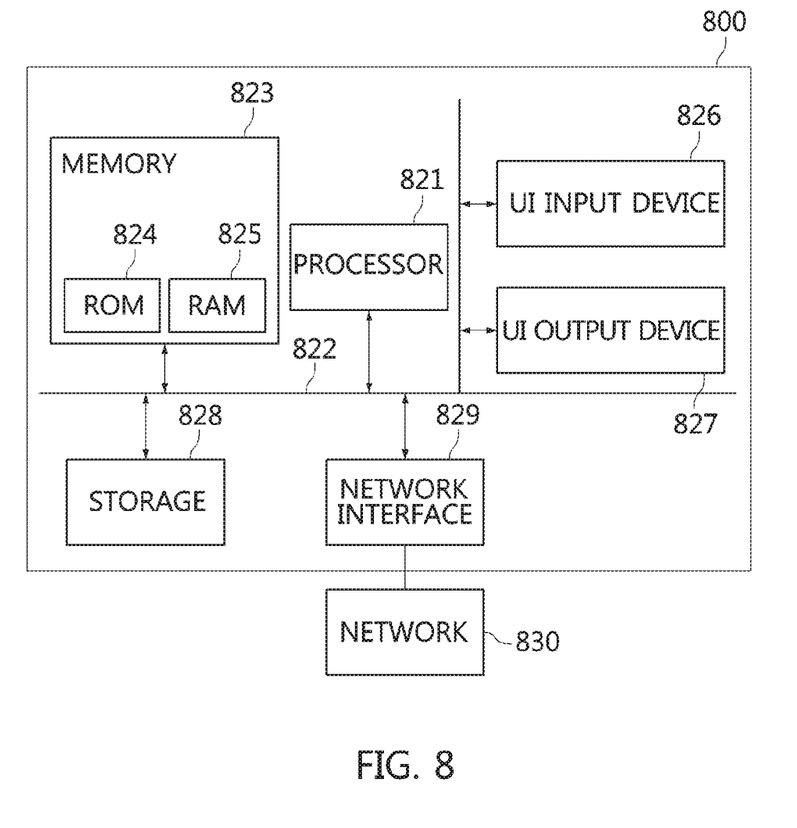
FIG. 8 illustrates an electronic device in which the fault tolerance analysis apparatus according to the embodiment is implemented.

FIG. 8 illustrates an electronic device in which the fault tolerance analysis apparatus according to the embodiment is implemented.

The fault tolerance analysis apparatus 100 may be implemented as an electronic device 800 shown in FIG. 8.

The fault tolerance analysis apparatus 100 may be implemented in a computer system including a computer-readable storage medium. As shown in FIG. 8, the electronic device 800 may include at least one processor 821, memory 823, a User Interface (UI) input device 826, a UI output device 827, and a storage 828, which communicate with each other through a bus 822. The electronic device 800 may further include a network interface 829 connected to a network 830. The processor 821 may be either a Central Processing Unit (CPU), or a semiconductor device for executing processing instructions stored in the memory 823 or the storage 828. The memory 823 and the storage 828 may be any of various types of volatile or nonvolatile storage media. For example, the memory may include Read Only Memory (ROM) 824 or Random Access Memory (RAM) 825.

At least one unit of the fault tolerance analysis apparatus 100 may be stored in the memory 823, and may be configured to be executed by the at least one processor 821. Functions related to communication of data or information of the fault tolerance analysis apparatus 100 may be performed via the network interface 829.

The method according to the embodiments may be implemented as a program that can be executed by various computer means, and may be recorded on a computer-readable storage medium. The computer-readable storage medium may include program instructions, data files, and data structures solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, provided are an apparatus and method for injecting faults into a simulation and analyzing fault tolerance for the injected faults.

Provided are an apparatus and method for analyzing the effect of a fault tolerance mechanism.

As described above, although the embodiments have been described with reference to a limited number of embodiments and drawings, those skilled in the art will appreciate that various changes and modifications are possible from the above descriptions. For example, even if the above-described technologies are performed in a sequence differing from that of the described method, and/or components such as a system, a structure, a device, and a circuit are coupled or combined in a way differing from that of the described method or are replaced with or substitute other components or equivalents, suitable results can be achieved.

Therefore, it should be understood that other embodiments and examples and equivalents of the accompanying claims belong to the scope of the accompanying claims.

What is claimed is:

1. An apparatus for analyzing fault tolerance, comprising at least one processor configured with instructions that when executed by the at least one processor implement:
    an information extraction unit for extracting design information from a design;
    a fault injection unit for injecting at least one fault into a simulation of the design based on the extracted design information and a parameter; and
    a fault tolerance analysis unit for analyzing an influence of the at least one fault on the simulation;
    wherein
    the fault tolerance analysis unit evaluates a fault tolerance mechanism of a processor represented by the design in response to a determination that the at least one fault, if injected into a processor not equipped with the fault tolerance mechanism, manifests itself as a malfunction of the processor.

2. The apparatus of claim 1, wherein the design is a processor design for a processor.

3. The apparatus of claim 1, wherein the design is represented in a Hardware Description Language (HDL).

4. The apparatus of claim 1, wherein the information extraction unit extracts the design information from the design using a Programming Language Interface (PLI).

5. The apparatus of claim 1, wherein the fault tolerance analysis unit analyzes the influence of the at least one fault by comparing information about a normal simulation with information about the simulation injected with the at least one fault.

6. The apparatus of claim 1, wherein the fault tolerance analysis unit determines whether the at least one fault manifests itself as a malfunction of a processor represented by the design.

7. The apparatus of claim 6, wherein the fault tolerance analysis unit is configured to, if the at least one fault does not cause an error in registers of the processor, determine that the at least one fault does not manifest itself as a malfunction of the processor.

8. The apparatus of claim 6, wherein the fault tolerance analysis unit is configured to, if the at least one fault has influence on occurrence of an error in writing to memory, determine that the at least one fault manifests itself as a malfunction of the processor.

9. The apparatus of claim 1, wherein the fault injection unit injects the at least one fault by manipulating registers in a processor represented by the design.

10. The apparatus of claim 1, wherein the information extraction unit extracts information about registers in the design.

11. The apparatus of claim 10, wherein the information about registers includes at least one of a name, a bit width, a Hardware Description Language (HDL) access path, or a module path of each register.

12. The apparatus of claim 1, wherein:
    the parameter controls a target into which the at least one fault is to be injected, and
    the target into which the at least one fault is to be injected is a signal or a module.

13. The apparatus of claim 1, wherein:
    the parameter controls attributes of faults, and
    the attributes of faults include at least one of a duration of each fault, a time of occurrence of each fault, an injection location of each fault, or a number of faults.

14. The apparatus of claim 1, wherein the fault tolerance analysis unit inserts a Value Change Dump (VCD) module for recording a write operation for memory in the simulation, which occurs during the simulation, into the memory.

15. The apparatus of claim 1, wherein the fault tolerance analysis unit is configured to:
    generate a first VCD module for a simulation into which the at least one fault is not injected,
    generate a second VCD module for a simulation into which the at least one fault is injected, and
    determine whether the at least one fault causes a malfunction of a processor represented by the design by comparing a recording of the first VCD module with a recording of the second VCD module.

16. A method for analyzing fault tolerance, comprising using at least one processor to execute instructions for:

extracting design information from a design;

injecting a fault into a simulation of the design based on the extracted design information and a parameter; and analyzing an influence of the fault on the simulation;

wherein the analyzing includes evaluating a fault tolerance mechanism of a processor represented by the design in response to a determination that the at least one fault, if injected into a processor not equipped with the fault tolerance mechanism, manifests itself as a malfunction of the processor.

* * * * *